US010127322B2

(12) United States Patent
Chakraborty et al.

(10) Patent No.: US 10,127,322 B2
(45) Date of Patent: Nov. 13, 2018

(54) EFFICIENT RETRIEVAL OF FRESH INTERNET CONTENT

(71) Applicant: MICROSOFT TECHNOLOGY LICENSING, LLC, Redmond, WA (US)

(72) Inventors: Doran Chakraborty, Sunnyvale, CA (US); Raghavan Muthuregunathan, Sunnyvale, CA (US); Manish Malik, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 576 days.

(21) Appl. No.: 14/631,483

(22) Filed: Feb. 25, 2015

(65) Prior Publication Data

US 2016/0246886 A1  Aug. 25, 2016

(51) Int. Cl.
*G06F 17/30* (2006.01)
(52) U.S. Cl.
CPC .... *G06F 17/30867* (2013.01); *G06F 17/3089* (2013.01)
(58) Field of Classification Search
CPC ........................ G06F 17/3089; G06F 17/30893
See application file for complete search history.

(56) References Cited

U.S. PATENT DOCUMENTS

| 8,892,591 | B1 | 11/2014 | Haugen et al. | |
| 9,380,013 | B1 * | 6/2016 | Cashmore | H04L 51/10 |
| 2010/0306192 | A1 | 12/2010 | Kapur et al. | |
| 2011/0295844 | A1 | 12/2011 | Sun et al. | |
| 2012/0150833 | A1 | 6/2012 | Parthasarathy et al. | |
| 2013/0198205 | A1 | 8/2013 | Zaman et al. | |
| 2013/0304818 | A1 | 11/2013 | Brumleve et al. | |
| 2014/0059029 | A1 | 2/2014 | Magill et al. | |
| 2014/0120953 | A1 | 5/2014 | Ingram et al. | |
| 2014/0344281 | A1 * | 11/2014 | Rao | H04L 67/22 707/741 |

FOREIGN PATENT DOCUMENTS

WO  2014005657 A1  1/2014

OTHER PUBLICATIONS

"International Search Report and Written Opinion Issued in PCT Application No. PCT/US2016/016252", dated May 9, 2016, 11 Pages.

(Continued)

*Primary Examiner* — Robert W Beausoliel, Jr.
*Assistant Examiner* — Nirav K Khakhar
(74) *Attorney, Agent, or Firm* — Shook, Hardy & Bacon L.L.P.

(57) ABSTRACT

Aspects of the technology described herein increase the efficiency of a search session by determining whether fresh content is likely to be responsive to the user's query. Whether fresh content is likely to be responsive to a specific query is determined by retrieving social media posts that are responsive to the query. The social media posts are evaluated for virality, which is the tendency of a social media post to be circulated rapidly and widely from one Internet user to another. The virality of a social media post can be determined by comparing a number of times the social media post has been re-communicated by individual users. Queries that return viral social media posts may be classified as seeking fresh content.

20 Claims, 5 Drawing Sheets

(56) References Cited

OTHER PUBLICATIONS

Ian Paul, Google's Real-Time Search Ready to Challenge Bing—Published Date: Dec. 8, 2009, 4 pages, http://www.pcworld.com/article/183984/google_real_time_search.htm.

Sanjay R. Kairam et al., Towards Supporting Search over Trending Events with Social Media—Published Date: 2013-07M Proceedings: In Proceedings of the Seventh International Conference on Weblogs and Social Media, 10 pages, http://research.microsoft.com/pubs/189366/trends_icwsm2013.pdf.

Mark Sullivan, Microsoft Bing Strikes Major Search Integration Deals with Twitter, Facebook—Published Date: Oct. 21, 2009, 3 Pages, http://www.pcworld.com/article/174050/bing2.html.

"Second Written Opinion Issued in PCT Application No. PCT/US2016/016252", dated Jan. 25, 2017, 5 Pages.

"International Preliminary Report on Patentability Issued in PCT Application No. PCT/US2016/016252", dated May 3, 2017, 8 Pages.

* cited by examiner

EFFICIENT RETRIEVAL OF FRESH INTERNET CONTENT

BACKGROUND

Conventional search engines are used to locate a variety of types of information (e.g., news, social posts, music, documents, presentations, people, companies, products, etc.). Conventionally, query intent is observed from analysis of search logs comprising a list of search terms, search results, and click-through information. The search engine may return results that a user is not interested in. To find a particular piece of information, the user typically must click through a link to review the corresponding document. The user may have to repeat this process multiple times if the desired information is not located in the first document accessed.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the technology described herein increase the efficiency of a search session by determining whether fresh content is likely to be responsive to the user's query. Increasing the efficiency of a search session decreases the energy consumption and process load within a data center facilitating the search engine by reducing the number of queries submitted by a user and the resulting need to process the queries and generate search results. Given the huge volume of search queries received by major search engines, even a small increase in efficiency can save significant total amounts of energy over the course of a day, month, or year.

Whether fresh content is likely to be responsive to a specific query is determined by retrieving a group of social media posts that are responsive to the query and determining whether the social media posts include viral posts. The virality of a social media post can be determined by comparing a number of times the social media post has been re-communicated.

Upon determining that above a threshold number of viral social media posts are included within a plurality of social media posts that are responsive to a search query, the search query is determined to be seeking fresh content. Fresh content is Internet content posted or generated within a freshness threshold from the time when the query is submitted. When the query is determined to be seeking fresh content, then the search engine can be transitioned to a fresh search mode that returns newer content.

The query can be a general query that is not specifically seeking social media results. Further, the final results page presented in response to a query need not include any social media posts. In other words, the presence of viral social media posts in a result set responsive to the query can be used as a proxy to determine that the user has an intent to retrieve fresh content even though the fresh content does not include social media posts.

BRIEF DESCRIPTION OF THE DRAWINGS

Aspects of the technology are described in detail below with reference to the attached drawing figures, wherein.

DETAILED DESCRIPTION

The subject matter of the technology described herein is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein increase the efficiency of a search session by determining whether fresh content is likely to be responsive to the user's query. Increasing the efficiency of a search session decreases the energy consumption and process load within a search engine's data center by reducing the number of queries submitted by a user and the resulting need to process the queries and generate search results. Given the huge volume of search queries received by major search engines, even a small increase in efficiency can save significant total amounts of energy.

Whether fresh content is likely to be responsive to a specific query is determined by retrieving social media posts that are responsive to the query. The social media posts are evaluated for virality, which is the tendency of a social media post to be circulated rapidly and widely from one Internet user to another. That is, the social media posts are evaluated to determine if viral social media posts are present within the social media posts that are responsive to the query.

The virality of a social media post can be determined by comparing a number of times the social media post has been re-communicated by individual users. Re-communication can take different forms according to the social media post involved. For example, a Facebook post can be liked or shared. Both liking and sharing can be forms or re-communication because liking and sharing can bring the original media post to the attention of other users. Within Twitter, a tweet can be retweeted or marked as a favorite, both of which can be a form or re-communication. Similar re-communication methods exist within other social media platforms and could be used in aspects of the technology described herein as a re-communication event.

Aspects of the technology described herein can use a re-communication rate for a social media post to determine whether it is viral. Specifically, a social media post's re-communication rate can be compared with a virality threshold to determine whether the social media post is viral. For example, a re-communication rate of 100 re-communications per hour could indicate that a social media post is viral if the virality threshold is 80 re-communications per hour. Different re-communication rate thresholds can be used as a social media post gets older. For example, a virality threshold of 10 re-communications per minute could be used for the first five minutes of a social media post's existence. A virality threshold of 20 re-communications per minute could be used when an age of the social media post is between five minutes and thirty minutes. Other virality thresholds could be used for different age ranges.

In one aspect, the virality thresholds are determined by retrospectively analyzing a plurality of social media posts that are designated as viral. In one aspect, the user designates a social media post as viral for purposes of the analysis. The average re-communication rate of the viral social media posts could be determined for different age ranges. In one aspect, the virality threshold for an age range is one standard deviation below the average re-communication rate of viral social media posts during the age range. Any new social media post having a re-communication rate above the virality threshold may be designated as viral.

Upon determining that above a threshold number of viral social media posts are included within a plurality of social media posts that are responsive to a search query, the search query is determined to be seeking fresh content. When the query is determined to be seeking fresh content, then the search engine can be transitioned to a fresh search mode. In one aspect, the fresh search mode increases the relevance of fresh search results, compared to older content that may otherwise have higher relevance due to a high click-through rate, high number of links, or other indicators of relevance that can increase with time and, if used, would then to cause newer or fresh content to be less relevant. The newer content can be any type of content including news articles, web pages, social media posts, blog posts, videos, pictures, or such.

Fresh content is any Internet content posted or generated within a freshness threshold time from the time when the query is submitted. For example, a news article published within three hours from the time a query is submitted could be considered fresh content. In one aspect, the freshness threshold is less than one day, for example, less than twenty hours, or less than twelve hours, or less than six hours, or less than three hours, or less than one hour, or less than thirty seconds. Different freshness thresholds may apply to different types of online content. For example, the refresh rate of a news site could be taken into consideration when calculating the freshness threshold. A news site that updates articles every three hours may be assigned a freshness threshold of six hours, meaning any news articles published during the last two refresh cycles may qualify as fresh content.

The query can be a general query that is not seeking social media results. Further, the final results page presented in response to a query need not include any social media posts. The presence of viral social media posts in a result set responsive to the query can be used as a proxy to determine that the user has an intent to retrieve fresh content even though the fresh content does not include social media posts.

Definitions Section

Having briefly described an overview of the technology described herein, a few frequently used terms are explicitly defined to orient the reader. Terms not included within the Definitions Section may be defined elsewhere, including by example.

Social Media Platform: A social media platform stores and distributes social posts. The social posts can be accessed through a website or application. The website or application can also allow users to generate social media posts. The publication of a social post may be to the general public or to a designated group of individuals. The individuals may be designated by an author of a social media post or be designated by virtue of their decision to receive social posts from the author. Social media platforms can include microblog sites. Examples of microblog sites include Twitter, Tumblr, Plurk, Squeeler, Beeing, and Jaiku. Social networking sites, such as Facebook, MySpace, and Linkedin, generate social media posts.

Social Media Post: A social media post is a user-generated communication distributed through a social media platform. A social media post may contain text, multimedia, and links to other content. A social media post may also contain metadata, like the user's location and language. Optionally, users may include hashtags within a social media post. The hashtag can designate the post's topic and may be used to identify related posts. In one aspect, advertisements taking the form of social media posts are not considered social media posts.

Microblog post: A microblog post is a type of social media post that is limited to a specific number of characters. A microblog post differs from a traditional blog entry primarily in size. A microblog post may be a sentence, a fragment, a few words, or a brief multimedia, such as a short video. A microblog post has a limited number of characters and can be published publicly or semi-publicly, for example to a user's followers. The microblog posts can often have a limited number of characters, such as about 250 characters or less, or about 200 characters or less, or about 160 characters or less, or about 140 characters or less, or about 100 characters or less. A microblog entry may contain text, multimedia, and links to other content. A microblog entry may also contain metadata, like the user's location and language. A tweet is one example of a microblog post. In one aspect, the microblog post may be status updates provided through a social media platform.

Social Media Feed: The social media feed is a real-time stream of data that communicates new social media posts (e.g., microblog posts) as the blog posts are published on the social media site. The social media feed is published by a social media platform. The social media feed may be processed to generate a searchable index, but the index is not the feed. Also, the feed is not the result of a web crawler analyzing published media posts.

Re-communication rate: The re-communication rate is the number of re-communication events occurring per unit of time. For example, the re-communication rate could be 100 re-communications per hour, 200 re-communications per minute, 50 re-communications per second, or such. A re-communication event occurs when a user causes a first social media post to be redistributed to the user's social network or the public. For example, the user could retweet a tweet, like a post, or similar.

Fresh Content: Fresh content is generated within a threshold time period from when a query is submitted. For example, fresh content could be any content generated less than two hours before a query is submitted. Content can be generated when it is first made publicly available through the Internet. Content can also be considered generated when previously available content is updated. The fresh content can be any type of content including news articles, web pages, social media posts, blog posts, videos, pictures, or such.

Aspects may define freshness with a fixed or sliding threshold. A fixed threshold could be a day, twelve hours, six hours, one hour, or such. A sliding threshold could be used based on a zero hour determination for the viral phenomenon. For example, the publication time of a viral social post determined to be related to the query could serve as the zero hour. In this aspect, only content generated after the zero hour would be considered fresh.

Having briefly described an overview of aspects of the technology described herein, an exemplary operating environment suitable for use in implementing aspects of the technology described herein is described below.

Exemplary Operating Environment

Figure 1:
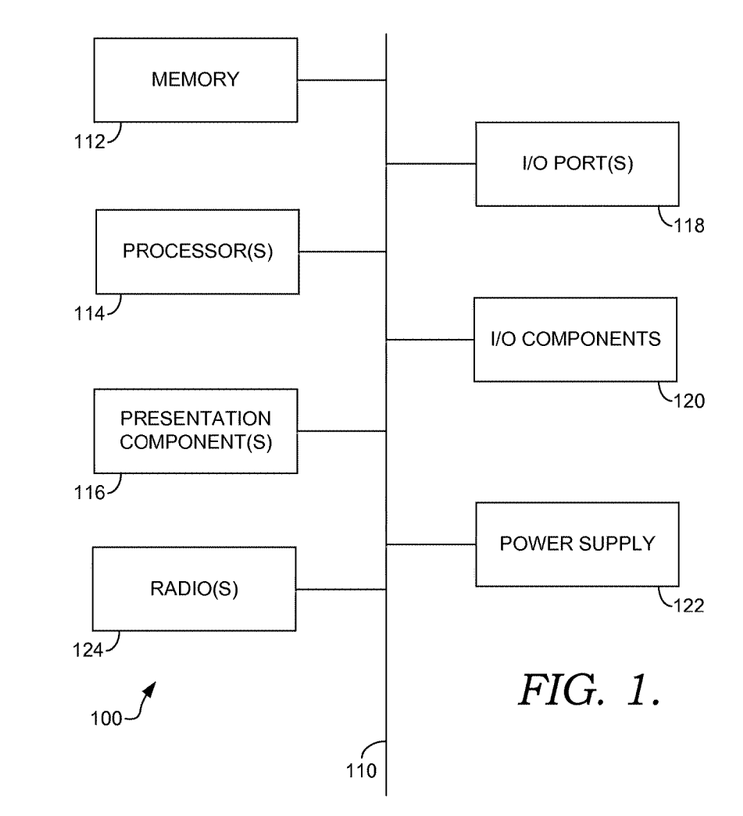
FIG. 1 is a block diagram of an exemplary computing environment suitable for implementing aspects of the technology described herein.

Referring to the drawings in general, and initially to FIG. 1 in particular, an exemplary operating environment for implementing aspects of the technology described herein is shown and designated generally as computing device 100. Computing device 100 is but one example of a suitable computing environment and is not intended to suggest any limitation as to the scope of use or functionality of the technology described herein. Neither should the computing device 100 be interpreted as having any dependency or requirement relating to any one or combination of components illustrated.

The technology described herein may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, specialty computing devices, etc. Aspects of the technology described herein may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more aspects of the technology described herein. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 114 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of the technology described herein.

A NUI processes air gestures, voice, or other physiological inputs generated by a user. Appropriate NUI inputs may be interpreted as ink strokes for presentation in association with the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

A computing device may include a radio. The radio transmits and receives radio communications. The computing device may be a wireless terminal adapted to received communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Figure 2:
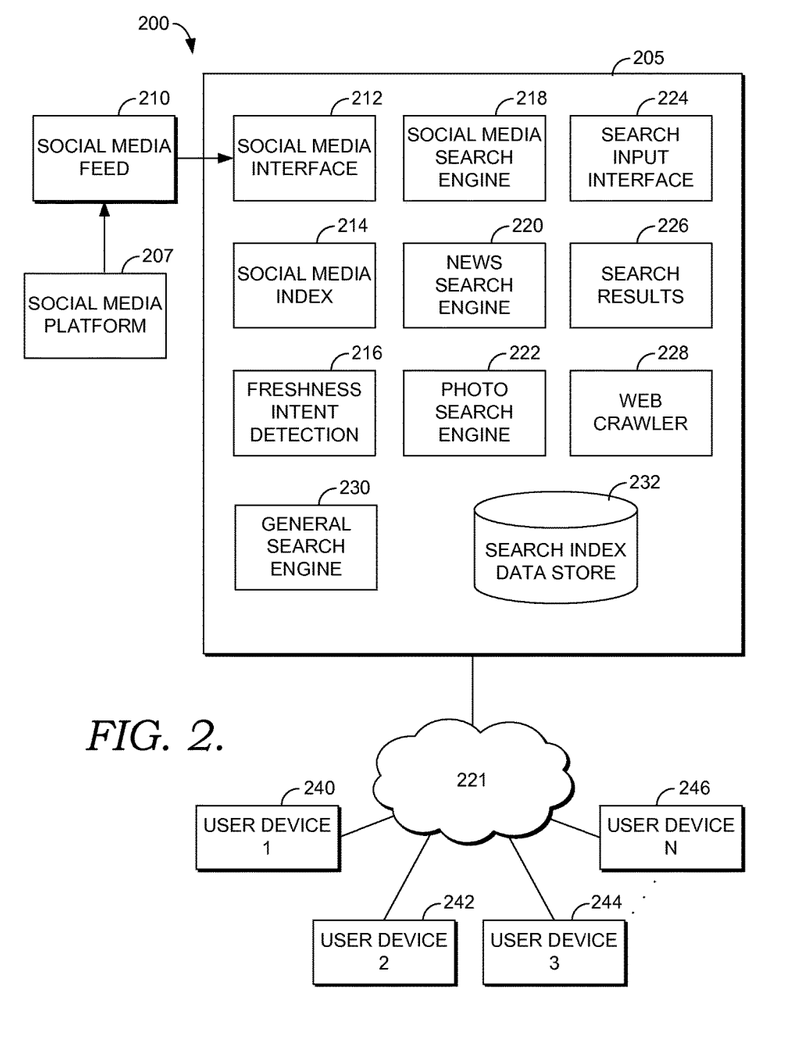
FIG. 2 is a diagram depicting a distributed computing environment for efficient retrieval of fresh Internet content, in accordance with an aspect of the technology described herein.

Turning now to FIG. 2, a computing environment 200 suitable for efficiently returning fresh content in response to a query seeking fresh content is provided, in accordance with an aspect of the technology described herein. The computing environment 200 includes search service 205, social media platform 207, social media feed 210, network 221, user device 1 240, user device 2 242, user device 3 244, and user device N 246. The search service 205 includes the social media interface 212, the social media index 214, the freshness intent component 216, the social media search engine 218, the news search engine 220, the photo search engine 222, the search input interface 224, the search results component 226, the web crawler 228, the general search engine 230, and the search index 232. In one aspect, the user devices communicate queries over the network 221 to the search service 205 and receive search results in return.

The search service 205 is a series of computer programs running in one or more data centers that are connected over the Internet to user devices through which queries may be received. The computer programs gather information about content available on the Internet, index the content, and use the indexes to generate search results that are responsive to a query. The search service 205 may comprise programs that specialize in particular types of content. For example, the search service 205 may offer search verticals that allow the user to explicitly designate a content of category to be searched, such as news, shopping, social media, and such.

The social media platform 207 is a series of computer programs running in one or more data centers that are connected over the Internet to user devices through which social media content may be generated and distributed. The social media platform 207 can keep track of user accounts and relationships between users. The social media platform 207 also stores social media posts generated by users and allows either the public, or users having a designated relationship with a user that generated content, to access the social media posts.

The social media feed 210 is a data stream of social media posts from the social media platform 207. The social media feed 210 can include a record of all social media posts generated by users of the social media platform 207 as the posts are generated.

The social media interface 212 receives the social media feed 210 and processes the feed for use by the search service 205. Exemplary processing includes spam detection and offensive content detection. Both spam and offensive content can be processed to avoid accidental distribution through the search service 205. The social media interface 212 can generate a social media index 214.

The social media index 214 includes a record of social media posts stored in a format that can be searched by the social media search engine 218.

The freshness intent component 216 is a program that determines whether a query is directed to fresh content. A query directed to fresh content can be described as having a freshness intent herein. In order to determine whether a query has a freshness intent, social media posts that are responsive to the query are evaluated for virality. The freshness intent component 216 can evaluate individual social media posts to determine whether the individual post is viral. The plurality of social media posts to be evaluated can be generated by the social media search engine 218. In one aspect, the freshness intent component 216 determines a re-communication rate for an individual post. The re-communication rate may be determined by analyzing the social media feed 210 to determine how many times an individual social media post has been re-communicated by users. The re-communication rate for an individual post may be compared against a re-communication rate threshold used to determine whether the post is viral. As mentioned, a different virality threshold can be used according to the age of an individual social media post. A freshness intent can be detected by the freshness intent component 216 when above a freshness threshold of the social media posts are viral. The freshness threshold can be one, in an aspect.

The social media search engine 218 is a specialized search apparatus optimized to return social media content that is responsive to a query. The social media content may be from a single social media platform or multiple social media platforms. The social media search engine 218 can limit results to a user's social network or return publicly available social media content. The social media search engine 218 can access the social media feed 210 and may also use an index of social media content to generate search results. In an aspect of the technology described herein, the social media search engine 218 may run a query received by a different search engine, such as the news search engine 220, the photo search engine 222, or the general search engine 230, to return relevant social media content. The social media content may be evaluated for viral content by the freshness intent component 216, as explained previously.

The news search engine 220 is a specialized search apparatus optimized to identify news articles that are responsive to a query. The news search engine 220 may use an index that includes only content classified as a news article. In one aspect, the news search engine 220 has multiple search modes, including a fresh search mode. There fresh search mode may cause the news search engine 220 to return only fresh news articles. Aspects of the technology described herein may define freshness with a fixed or sliding threshold. A fixed threshold could be a day, twelve hours, six hours, one hour, or such. A sliding threshold could be used based on a zero hour determination for the viral phenomenon. For example, the publication time of a viral social post determined to be related to the query could serve as the zero hour. In this aspect, only news content generated after the zero hour would be returned when the news search engine 220 is in fresh mode.

The photo search engine 222 is a specialized search apparatus optimized to return visual content, such as photos. The photo search engine 222 may use a photo index based on metadata associated with the photos to return photos that are responsive to a query. In one aspect, the photo search engine 222 uses a photo classification algorithm to identify content within online photographs. Each photo may be associated with a publication date or a date when the photo search engine 222 first became aware of the photo. The photo search engine 222 may use a crawler to explore different websites and retrieve an index of photos. The photos may not be associated with a publication date, but the date the crawler retrieves the photo may be used instead. Alternatively, a time may be associated with the photo between the times a crawler visited a particular website. For example, if a photo is not present at a first time when the crawler analyzes a website but was present the second time, then the photo may be assigned a publication date between the first and second visit.

The search input interface 224 is a computer program configured to receive search queries from user computing devices. The search input interface 224 may generate a webpage with a search box through which queries may be submitted. The search input interface 224 may also be capable of receiving queries from applications running on a user device. Exemplary applications include a voice search application and a digital assistant application. In the case of a voice search for digital assistant application, the application may translate the voice to text or just communicate the audio content for the search input interface 224 to translate to text. The search input interface 224 communicates the query to the appropriate search engine. In one aspect, the search input interface 224 includes a classification feature that initially determines a subject matter, such as news, shopping, photographs, or social content, that may interest the user. The query is then submitted to the search engine that corresponds to the subject matter. The search input interface 224 may also include components that allow a user to explicitly select a subject matter for searching. The subject matter selection may be described as selecting a search vertical.

The search results component 226 is a program that receives search results from a search engine and outputs the results to a user computer device. In one aspect, the search results component 226 generates a search results webpage that is accessible to the user device. The search results webpage can list a series of search results in the form of snippets that summarize the content and links that allow the user to access the content. Alternatively, the search results may be communicated in a format that is consumable by an application running on the user device.

The web crawler 228 is a program that automatically browses web content and generates an index, such as search index 232. The web crawler 228 may start with a series of URLs and then follow links on the list of URLs to find additional content. Each page browsed may be added to an index. Content on the Internet is changing constantly, making it a challenge to keep an index updated. The web crawler 228 may prioritize webpages based on a frequency of observed change. Pages that change infrequently may be visited less frequently than pages that change frequently. While listed as a separate component here, a web crawler may also be associated or considered part of a search engine. For example, a series of web crawlers may be used to index photos, news, or other information for a subject matter specific search engine. It should be noted that a social media feed 210 is not generated by a web crawler but is instead provided directly to the social media interface 212. In other words, the social media feed 210 can be generated without a web crawler visiting the social media platform.

The general search engine 230 is a system designed to retrieve search results that are relevant to a query. In contrast to a subject matter specific search engine, the general search engine 230 may retrieve content of different types, including photographs, news, social media, or other content.

The search index 232 is an organized data store for content. The search index 232 may be populated by the web crawler 228 and includes information that describes each piece of content indexed. The search index 232 may include multiple indexes or otherwise classify content according to different subject matter categories or search verticals. For example, the search index 232 may include a social media index, photo index, news index, shopping index, fresh index, or other indexes.

Figure 3:
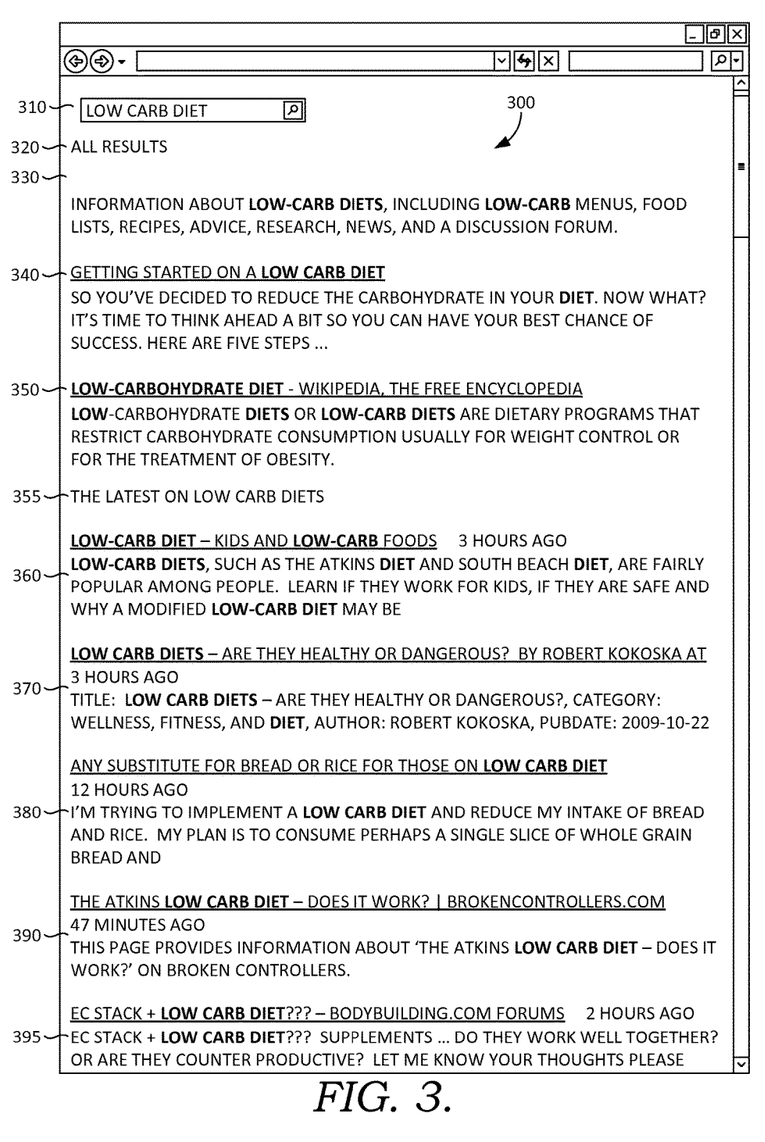
FIG. 3 is a diagram depicting a search results page showing fresh content according to an aspect of the technology described herein.

Turning now to FIG. 3, a search results page displaying a fresh results section is shown, in accordance with an embodiment of the technology described herein. Displaying a section of fresh results is one possible method of presenting fresh results when the query is determined to be seeking fresh results. In an alternative, all of the results presented are fresh. The search results page 300 may be displayed by a web browser. In the example shown, a user has submitted a search query 310 "low-carb diet." In aspects of the technology described herein, a plurality of social posts that are responsive to the query "low-carb diet" are returned but not immediately presented. The social posts are analyzed to determine whether above a threshold number of the social posts are viral. In one aspect, the threshold number is one. Other thresholds are possible.

For this example, the plurality of social posts included several viral tweets related to low-carb diets because a celebrity doctor recently criticized the weight loss benefits of a low-carb diet. Accordingly, the search engine transitions to a fresh content mode and generates a fresh search results page that is different from a standard search results page returned when a query is determined not to be seeking fresh content.

In response, two sets of results are shown. The main results section 320 and fresh results section 355. The main results section 320 shows search results that are selected based on a document's overall responsiveness to the search query 310. The main results section 320 includes search result 330, search result 340, and search result 350. Each of the search results describes a document related to low-carb diets. The documents could be news articles, web pages, blog posts, or such.

The fresh results section 355 shows documents with a recent publication date. What is meant by "recent" may vary across different embodiments of the technology described herein. For example, recent documents could be published within the previous day, week, or even hours. The point is that a method is used to differentiate between "recent" and "not recent" documents In the embodiment shown, a publication date is shown with each of the search results in the fresh results section 355. Search result 360 was published three hours ago. Search result 370 was published three hours ago. Search result 380 was published twelve hours ago. Search result 390 was published 47 minutes ago. Search result 395 was published two hours ago.

As can be seen, the search results in the fresh results section 355 may not be ordered strictly based on their date of publication. Rather, in the example shown, the publication date acts as a filter. In other words, documents with a publication date beyond a threshold period are not eligible for inclusion in the fresh results section 355. In one embodiment, recently published documents are ordered by responsiveness within the fresh results section 355. Calculation or determination of the user's intention to receive fresh search results will be described in more detail subsequently.

Figure 4:
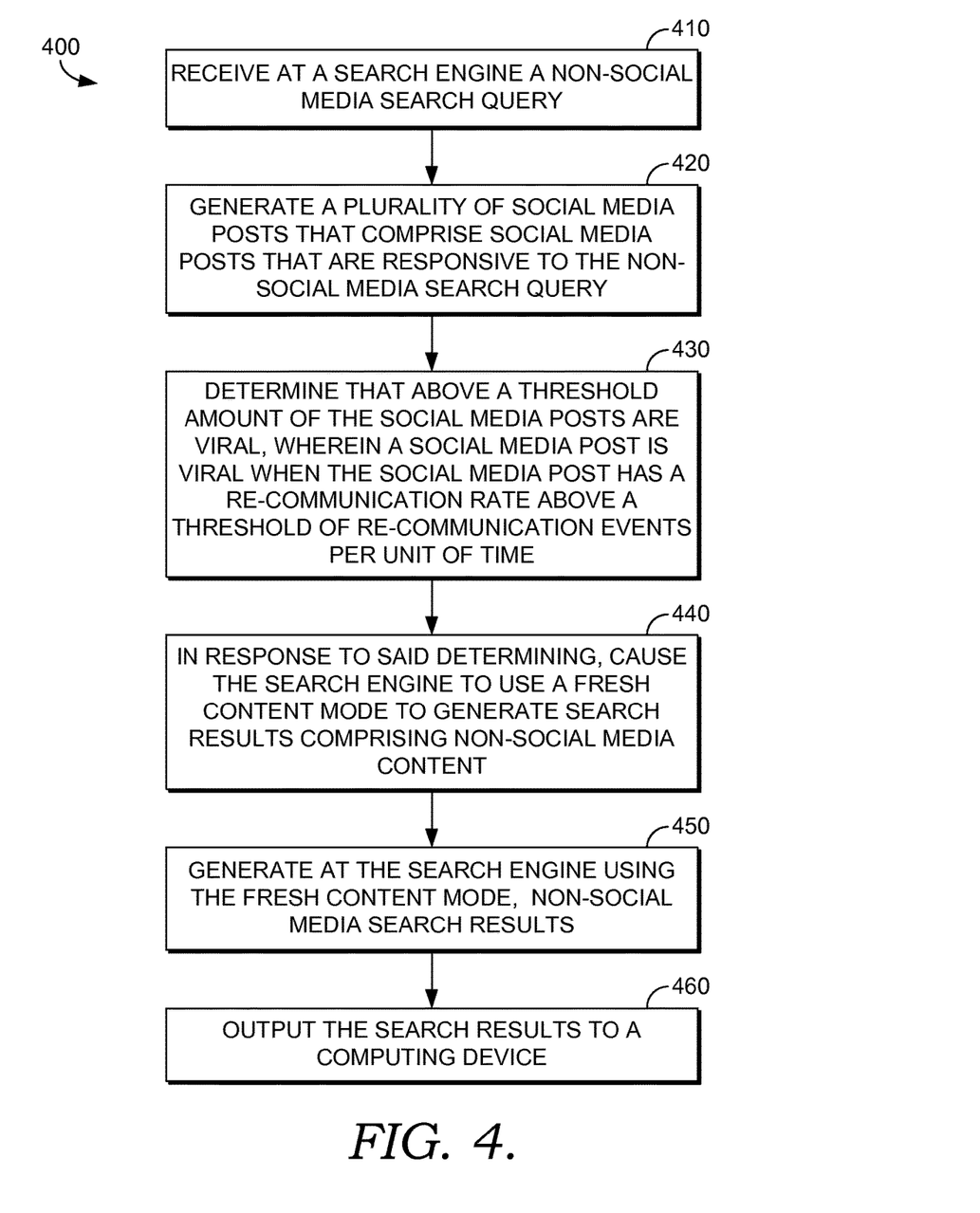
FIG. 4 is a flow chart depicting a decision process to select a collaboration mechanism, in accordance with an aspect of the technology described herein.

Turning now to FIG. 4, a method 400 that presents search results comprising fresh content is shown, in accordance with an aspect of the technology described herein. Method 400 may be performed by a search service, such as search service 205, operating in one or more data centers. The search service can communicate with user devices over a wide area network, such as the Internet.

At step 410, the search service receives a non-social media search query. A non-social media query is not directed to social media content. A query is directed to social media content when it is submitted to a social media search vertical or includes a designation, such as a hashtag, indicating that social media results are sought. Similarly, a non-social media query is not submitted by a social media application or through an interface on a social media platform. The query may be received through a search interface page provided by the search service. In another aspect, the query is received from an application running on a user device. Applications that can communicate queries to the search service include digital assistants, text search applications, and voice search applications.

At step 420, a plurality of social media posts are generated. The social media posts comprise social media posts that are responsive to the non-social media search query. The social media posts may be generated by a search engine optimized to search social media content from one or more social media platforms. In one aspect, the search engine that returns the social media posts accesses a social media feed to generate search results. Accessing a social media feed can include generating or updating a social media post index in real time as the social media feed is received. Aspects can include searching the social media index or the social media feed directly. In one aspect, the social media posts comprise microblog entries, such as tweets.

At step 430, a determination is made that above a threshold amount of the social media posts are viral. A social media post is viral when the social media post has a re-communication rate above a threshold of re-communication events per unit of time. In one aspect, the threshold of re-communication events per unit of time is different for content having different age ranges. For example, the age ranges could comprise a first range of an age less than five minutes, a second range of between five minutes and less than thirty minutes, a third range between thirty minutes and less than sixty minutes, a fourth range between sixty minutes and twelve hours, and a fifth range between twelve hours and twenty-four hours. Each of these age ranges could be assigned a different re-communication rate threshold. Generally, the older the age range the larger the re-communication rate.

As mentioned, the re-communication rate for each age range can be derived by analyzing viral media posts retrospectively. A plurality of viral media posts may be taken as an input for the analysis. An average re-communication rate for the plurality of viral media posts can be determined within each desired age range. The average re-communication rate can be used as the threshold to evaluate new social media posts for virality.

At step 440, in response to the determination, the search engine is caused to use a fresh content mode to generate search results comprising non-social media content. In one aspect, an instruction to use fresh mode is communicated to the search engine. The non-social media content can be any type of content including news articles, web pages, social media posts, blog posts, videos, pictures, or such At step 450, the search engine generates the non-media search results using the fresh content mode. In one aspect, the fresh content mode comprises running the non-social media query through a fresh search engine that retrieves content from a fresh index that only indexes content that satisfies a fresh criteria. The fresh criteria could be an age, such as one day old. The fresh criteria could also be related to an age of viral social media posts within the plurality of social media posts returned initially. For example, if the age of the oldest viral media post is three hours old, then the freshness criteria could be set to three hours or another number based on the age of the oldest viral media post. For example, the fresh criteria could be the age of the oldest viral media post +2 hours. In other words, if the oldest viral media post is three hours old, the freshness criteria could be five hours.

As an alternative to using a fresh index, aspects can use a modified relevance ranking algorithm that gives more weight to the age of a content than a default ranking algorithm. The modified relevance ranking algorithm can increase the relevance rank of new content compared to the rank new content would be given using the default ranking algorithm. Other methods of generating fresh results may be possible.

At step 460, the search results are communicated to a computing device that submitted the query.

Figure 5:
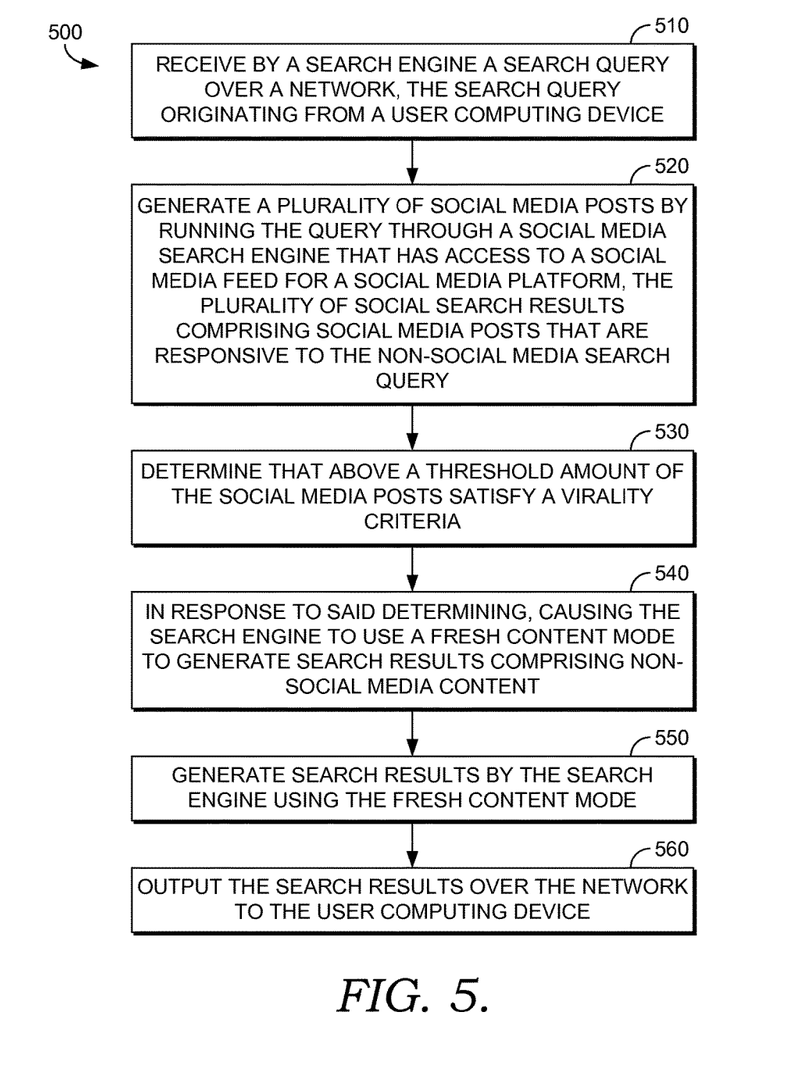
FIG. 5 is a flow chart depicting a method that presents search results comprising fresh content, in accordance with an aspect of the technology described herein.

Turning now to FIG. 5, a method 500 of presenting search results comprising fresh content is provided, in accordance with an aspect of the technology described herein. Method 500 may be performed by a search service, such as search service 205, operating in one or more data centers. The search service can communicate with user devices over a wide area network, such as the Internet.

At step 510, a search engine receives a search query over a network. The search query originates from a user computing device. The search query is a non-media search query in one aspect.

At step 520, a plurality of social media posts are generated by running the query through a social media search engine that has access to a social media feed for a social media platform. The plurality of social media posts comprises social media posts that are responsive to the search query. In one aspect, the social media posts comprise microblog entries, such as tweets.

At step 530, a determination is made that above a threshold amount of the social media posts satisfy a virality criteria. In one aspect, the threshold amount of the social media posts is one or more viral social media posts. The virality criteria for an individual social media post can be a re-communication rate for the social media post being above a threshold of re-communication events per unit of time. The threshold of re-communication events per unit of time can change according to an age of a social media post.

At step 540, in response to said determining, the search engine is caused to use a fresh content mode to generate search results comprising non-social media content. As mentioned, the fresh content mode may return content listed in a fresh index or give more weight to newer content when determining content relevance.

At step 550, search results are generated by the search engine using the fresh content mode. The search results may include only general, non-social media content. At step 560, the search results are output over the network to the user computing device.

In one aspect, the virality criteria or threshold is determined by analyzing a plurality of social media posts determined to be viral. The viral posts are collected and analyzed to determine an average re-communication rate during one or more age ranges, for example the first age range. This method may be repeated to calculate an average re-communication rate for each desired range. A standard deviation for the average re-communication rate during the first age range is determined, and the virality criteria for social media posts having an age within the first age range is set to one standard deviation below the average re-communication rate during the first age range. In another aspect, the average is used instead of the standard deviation.

In one aspect, the step of collecting a plurality of viral social media posts comprises communicating a plurality of social media posts to one or more people through a computer interface and receiving a classification of the social media posts as either viral or not viral from the one or more people.

Embodiments of the technology described herein have been described in relation to particular embodiments, which are intended in all respects to be illustrative rather than restrictive. Alternative embodiments will become apparent to those of ordinary skill in the art to which the technology described herein pertains without departing from its scope.

Embodiment 1

One or more computer-storage media storing computer-executable instructions that, when executed by a computing device having a processor, cause the computing device to perform a method that presents search results comprising fresh content, the method comprising: receiving at a search engine a non-social media search query; generating a plurality of social media posts that are responsive to the non-social media search query; determining that above a threshold amount of the social media posts are viral, wherein a social media post is viral when the social media post has a re-communication rate above a threshold of re-communication events per unit of time; in response to said determining, causing the search engine to use a fresh content mode to generate search results comprising non-social media content; generating at the search engine using the fresh content mode, non-social media search results; and outputting the non-social media search results to a remote computing device that submitted the non-social media query.

Embodiment 2

The media of embodiment 1, wherein said generating at the search engine using the fresh content mode comprises running the non-social media query through a fresh search engine that retrieves content from a fresh index that only indexes content that satisfies a fresh criteria.

Embodiment 3

The media of any one of the above embodiments, wherein the plurality of social media posts that comprise social media posts are generated by running the non-social media search query through a social media search engine.

Embodiment 4

The media of embodiment 3, wherein the social media search engine has access to a social media feed that includes a real-time record of all public social posts within a social media platform.

Embodiment 5

The media of any one of the above embodiments 1, wherein said generating at the search engine using the fresh content mode comprises running the non-social media query through the search engine and assigning a relevance to responsive content using a fresh ranking algorithm that gives more weight to a content's age than a default ranking algorithm used when the search engine is not in the fresh content mode.

Embodiment 6

The media of any one of the above embodiments, wherein the threshold of re-communication events per unit of time is different for social media posts having different age ranges.

Embodiment 7

The media of embodiments 6, wherein the different age ranges comprise a first range of an age less than five minutes, a second range of between five minutes and less than thirty minutes, a third range between thirty minutes and less than sixty minutes, a fourth range between sixty minutes and twelve hours, and a fifth range between twelve hours and a twenty four hours.

Embodiment 8

A method of presenting search results comprising fresh content, the method comprising: receiving by a search engine a search query over a network, the search query originating from a user computing device; generating a plurality of social media posts that are responsive to the search query by running the search query through a social media search engine that has access to a social media feed for a social media platform; determining that above a threshold amount of the social media posts satisfy a virality criteria; in response to said determining, causing the search engine to use a fresh content mode to generate search results comprising non-social media content; generating search results by the search engine using the fresh content mode; and outputting the search results over the network to the user computing device.

Embodiment 9

The method of embodiment 8, wherein the virality criteria for an individual social media post is a re-communication rate for the social media post being above a threshold of re-communication events per unit of time.

Embodiment 10

The method of embodiment 9, wherein the threshold of re-communication events per unit of time changes according to an age of a social media post.

Embodiment 11

The method of any one of embodiments 8-10, wherein the threshold amount of the social media posts is one or more viral social media posts.

Embodiment 12

The method of any one of embodiments 8-11, wherein the search query is a non-media search query.

Embodiment 13

The method of any one of embodiments 8-12, wherein the method further comprises determining the virality criteria by: collecting a plurality of viral social media posts; for a first age range of the social media posts ascertaining an average re-communication rate during the first age range; determining a standard deviation for the average re-communication rate during the first age range; setting the virality criteria for social media posts having an age within the first age range to one standard deviation below the average re-communication rate during the first age range.

Embodiment 14

The method of any one of embodiments 8-13, wherein the method further comprises determining the virality criteria by: collecting a plurality of viral social media posts; for a first age range of the social media posts ascertaining an average re-communication rate during the first age range; and setting the virality criteria for social media posts having an age within the first age range to the average re-communication rate during the first age range.

Embodiment 15

The method of any one of embodiments 8-14, wherein said collecting a plurality of viral social media posts comprises communicating a plurality of old social media posts to one or more people through a computer interface and receiving a classification of the social media posts as either viral or not viral from the one or more people.

Embodiment 16

A computing system that is configured to generate fresh search results in response to a query classified as related to fresh content, the system comprising: a search input interface configured to receive a query from a remote computing device; a social media interface configured to receive a social media feed from a social media platform; a social media search engine configured to identify social media posts that are relevant to the query and assign a relevance rank to the social media posts; a fresh intent component configured to: (1) receive social media posts from the social media search engine that are responsive to the query, (2) determine an amount of the social media posts that satisfy a virality threshold; (3) classify the query as fresh seeking when the amount exceeds a freshness threshold, and (4) instruct a search engine to process the query to generate fresh search results; the search engine configured to operate in a fresh content mode, run the query, and generate a set of search results that includes afresh content; and a search results interface configured to communicate the set of search results to the remote computing device.

Embodiment 17

The computing system of embodiment 16, wherein the fresh content has an age of less than one day.

Embodiment 18

The computing system of any one of embodiments 15-17, wherein the freshness threshold is one or more viral social media posts.

Embodiment 19

The computing system of any one of embodiments 15-18, wherein the virality threshold for an individual social media post is a re-communication rate for the individual social media post being above a threshold of re-communication events per unit of time.

Embodiment 20

The computing system of any one of embodiments 15-19, wherein the individual social media post is a micro-blog post.

Aspects of the technology described herein have been described to be illustrative rather than restrictive. It will be understood that certain features and subcombinations are of utility and may be employed without reference to other features and subcombinations. This is contemplated by and is within the scope of the claims.

The invention claimed is:
1. One or more computer-storage media comprising computer executable instructions that, when executed by a computing device, cause the computing device to perform a method to generate fresh search results in response to a query classified as related to fresh content, the method comprising:
receiving at a search engine a query through a search input interface from a remote computing device, the search engine having a default mode and a fresh mode that gives more weight to newer responsive content than the default mode;
receiving a social media feed from a social media platform;
identifying a plurality of social media posts that are relevant to the query by using a relevance rank assigned to the social media posts;
calculating a re-communication rate for posts within the plurality of social media posts, wherein the re-communicate rate is a measure of re-communication events per unit of time;
determining an amount of the plurality of social media posts that satisfy a virality threshold, wherein a social media post is viral when the social media post has a re-communication rate above a threshold;
classifying the query as fresh seeking when the amount exceeds a freshness threshold;

in response to said classifying the query as fresh seeking, causing the search engine to use a fresh content mode to generate non-social media search results comprising non-social media fresh content that comprise newly published content that would have a lesser relevancy rank in a standard search result set generated by the search engine in the default mode;

generating search results by the search engine using the fresh content mode; and communicating the set of search results to the remote computing device.

2. The media of claim 1, wherein the fresh content has an age of less than one day.

3. The media of claim 1, wherein the freshness threshold is one or more viral social media posts.

4. The media of claim 1, wherein the virality threshold for an individual social media post is a re-communication rate for the individual social media post being above a threshold of re-communication events per unit of time.

5. The media of claim 1, wherein the individual social media post is a microblog post.

6. One or more computer storage media storing computer-executable instructions that, when executed by a computing device having a processor, cause the computing device to perform a method that presents search results comprising fresh content, the method comprising:

receiving at a search engine a non-social media search query, the search engine having a default mode and a fresh mode that gives more weight to newer responsive content than the default mode;

generating a plurality of social media posts that are responsive to the non-social media search query;

determining that above a threshold amount of the plurality of social media posts are viral, wherein a social media post is viral when the social media post has a re-communication rate above a threshold of re-communication events per unit of time;

in response to said determining, causing the search engine to use a fresh content mode to generate search results comprising non-social media content;

generating, at the search engine using the fresh content mode, non-social media search results that comprise newly published content that would have a different relevancy rank in a standard search result set generated by the search engine in the default mode; and outputting the non-social media search results to a remote computing device that submitted the non-social media query.

7. The media of claim 6, wherein said generating at the search engine using the fresh content mode comprises running the non-social media query through a fresh search engine that retrieves content from a fresh index that only indexes content that satisfies a fresh criteria.

8. The media of claim 6, wherein the plurality of social media posts that comprise social media posts are generated by running the non-social media search query through a social media search engine.

9. The media of claim 8, wherein the social media search engine has access to a social media feed that includes a real-time record of all public social posts within a social media platform.

10. The media of claim 6, wherein said generating at the search engine using the fresh content mode comprises running the non-social media query through the search engine and assigning a relevance to responsive content using a fresh ranking algorithm that gives more weight to a content's age than a default ranking algorithm used when the search engine is not in the fresh content mode.

11. The media of claim 6, wherein the threshold of re-communication events per unit of time is different for social media posts having different age ranges.

12. The media of claim 11, wherein the different age ranges comprise a first range of an age less than five minutes, a second range of between five minutes and less than thirty minutes, a third range between thirty minutes and less than sixty minutes, a fourth range between sixty minutes and twelve hours, and a fifth range between twelve hours and twenty-four hours.

13. A method of presenting search results comprising fresh content, the method comprising:

receiving by a search engine a search query over a network, the search query originating from a user computing device;

generating a plurality of social media posts that are responsive to the search query by running the search query through a social media search engine that has access to a social media feed for a social media platform;

determining that above a threshold amount of the plurality of social media posts are viral, wherein a social media post is viral when the social media post has a re-communication rate above a threshold of re-communication events per unit of time;

in response to said determining, causing the search engine to use a fresh content mode to generate search results comprising non-social media content;

generating search results by the search engine using the fresh content mode, wherein the search results comprise newly published non-social media content that would have a different relevancy rank in a standard search result set generated by the search engine in the default mode; and outputting the search results over the network to the user computing device.

14. The method of claim 13, wherein the virality criteria for an individual social media post is a re-communication rate for the social media post being above a threshold of re-communication events per unit of time.

15. The method of claim 14, wherein the threshold of re-communication events per unit of time changes according to an age of a social media post.

16. The method of claim 13, wherein the threshold amount of the social media posts is one or more viral social media posts.

17. The method of claim 13, wherein the search query is a non-social media search query.

18. The method of claim 13, wherein the method further comprises determining the virality criteria by:

collecting a plurality of viral social media posts;

for a first age range of the social media posts, ascertaining an average re-communication rate during the first age range;

determining a standard deviation for the average re-communication rate during the first age range; and setting the virality criteria for social media posts having an age within the first age range to one standard deviation below the average re-communication rate during the first age range.

19. The method of claim 13, wherein the method further comprises determining the virality criteria by:

collecting a plurality of viral social media posts;

for a first age range of the social media posts, ascertaining an average re-communication rate during the first age range; and setting the virality criteria for social media posts having an age within the first age range to the average re-communication rate during the first age range.

20. The method of claim 19, wherein said collecting a plurality of viral social media posts comprises communicating a plurality of old social media posts to one or more people through a computer interface and receiving a classification of the social media posts as either viral or not viral from the one or more people.

* * * * *